(No Model.)

C. T. MONROE.
WATER WHEEL.

No. 600,737.  Patented Mar. 15, 1898.

WITNESSES:
Paul Jahet
C. R. Ferguson

INVENTOR
C. T. Monroe
BY
ATTORNEYS.

UNITED STATES PATENT OFFICE.

CHARLES T. MONROE, OF WISDOM, MONTANA, ASSIGNOR OF ONE-HALF TO JOSEPH M. MICHELSON, OF SAME PLACE.

WATER-WHEEL.

SPECIFICATION forming part of Letters Patent No. 600,737, dated March 15, 1898.

Application filed June 25, 1897. Serial No. 642,287. (No model.)

*To all whom it may concern:*

Be it known that I, CHARLES T. MONROE, of Wisdom, in the county of Beaver Head and State of Montana, have invented a new and Improved Water-Wheel, of which the following is a full, clear, and exact description.

This invention relates to improvements in water-wheels; and the object is to so construct a wheel that practically all the water running into it will be utilized, thus insuring a maximum of power with a minimum of water flow; and, further, to so arrange the wheel with relation to the water-supply pipe that the wheel when stopped will act as a cut-off for the water and retain or store the same in the buckets.

I will describe a water-wheel embodying my invention, and then point out the novel features in the appended claim.

Reference is to be had to the accompanying drawings, forming a part of this specification, in which similar characters of reference indicate corresponding parts in all the views.

Figure 1:
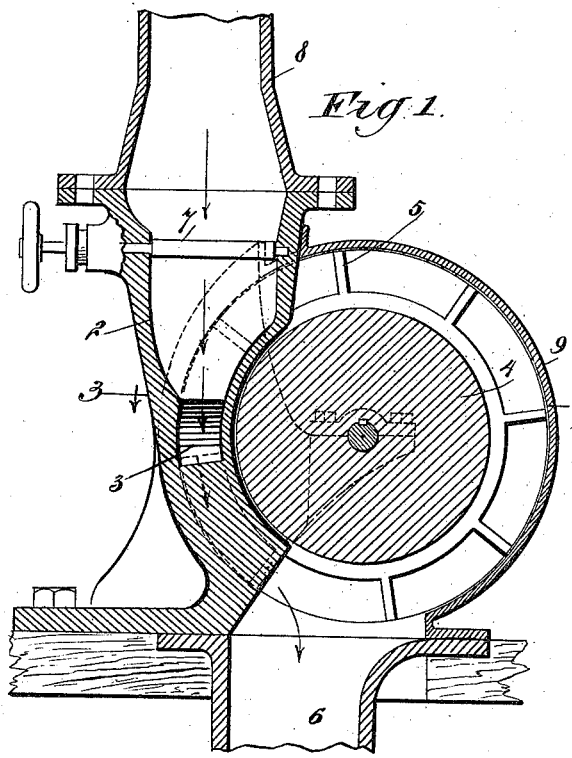
Figure 2:
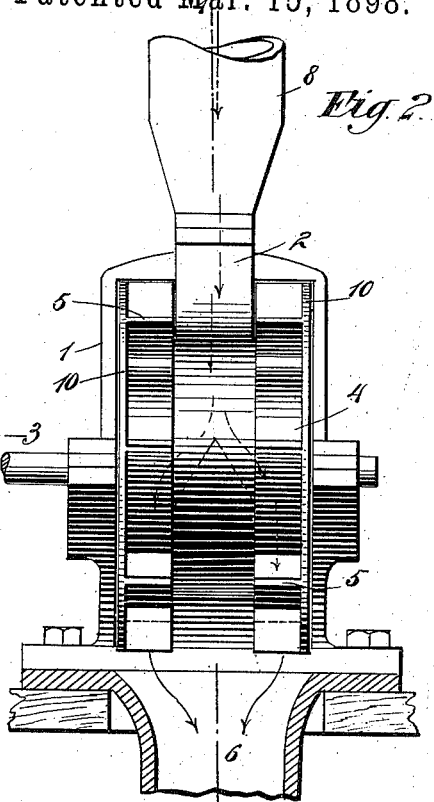
Figure 3:
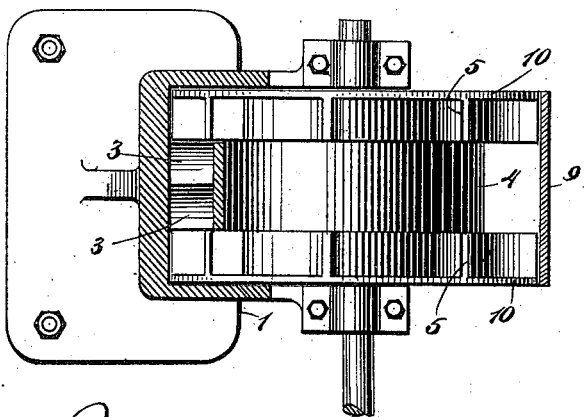
Figure 4:
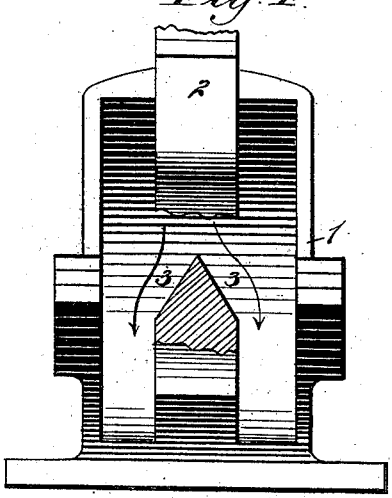

Figure 1 is a section on the line 1 1 of Fig. 2 of a water-wheel embodying my invention. Fig. 2 is a partial section and partial front elevation with the front casing removed. Fig. 3 is a section on the line 3 3 of Fig. 1, and Fig. 4 is a front elevation of the casing with a portion of the water-supply pipe broken away to more clearly show the outlets.

Referring to the drawings, 1 designates a casing made in the segment of a circle, and into this casing a water-feed pipe 2 extends. The water-feed pipe has lateral outlets 3, the bottom walls of which are inclined downward and outward, as plainly indicated in Fig. 4.

Mounted to rotate in the casing is a wheel 4, having radial blades or buckets 5 on its periphery. It will be noted that the buckets 5 are at the sides of the wheel, so as to receive the lateral discharge of water from the pipe 2. Between the blades or buckets 5 the wheel has a smooth periphery which engages closely against a curved surface of the pipe 2, as shown in Fig. 1. Below the wheel is an outlet-pipe 6 for the discharge of water, and the pipe 2 is provided with a gate or valve 7, here shown as mounted to rotate on a horizontal axis. The pipe 2 is rectangular in cross-section, and its sides will engage closely against and form walls for the inner ends of the blades or buckets 5, so as to prevent as much as possible the escape of water at the sides. The upper portion of the pipe 2 is provided with a cylindrical extension-pipe 8, adapted for connection with an ordinary water-pipe.

Connected to the casing and extended around the forward portion of the wheel is a cover or jacket 9, and as this cover or jacket 9 engages closely against annular flanges 10 on the periphery of the wheel at the outer ends of the blades or buckets it is obvious that the said casing will prevent water from being thrown outward by the centrifugal action of the wheel and that the flanges form the outer walls of the buckets.

It is obvious that when the wheel is at rest a certain amount of water will be stored or retained in some of the buckets and therefore there will be practically little or no loss of water.

Having thus described my invention, I claim as new and desire to secure by Letters Patent—

A water-wheel, comprising a casing, a water-wheel mounted in the casing, blades or buckets on the periphery of the wheel, at its opposite sides, flanges on the wheel forming the outer walls of the buckets, and a water-feed pipe extended into the casing and having lateral outlets, the said pipe being adapted to engage against the inner ends of opposite blades to form the inner walls of the buckets, substantially as specified.

CHARLES T. MONROE.

Witnesses:
 OWEN ELLIS,
 J. P. LOSEL.